United States Patent

[11] 3,616,228

[72] Inventors Kurt Schubert
Hermann-Lons-Strasse 52;
Karl-Heinz Adand Böhme, Georg-Schumann-Strasse 14; CLäre Hörhold, Strasse des. 8 Mai 20, all of 69 Jena, Germany
[21] Appl. No. 806,714
[22] Filed Mar. 12, 1969
[45] Patented Oct. 26, 1971

[54] β-SUBSTITUTED PROPIONIC ACIDS AND METHOD OF MAKING THE SAME
8 Claims, No Drawings
[52] U.S. Cl. .................................................. 195/51,
260/343.2, 260/287, 260/345.2, 260/326.13, 260/346.2, 260/488, 260/514
[51] Int. Cl. ...................................................... C12d 1/02
[50] Field of Search .......................................... 195/51, 51 A, 28

[56] References Cited
UNITED STATES PATENTS
3,000,792 9/1961 Denkewalter et al. ......... 195/115
3,375,174 3/1968 Crabbe et al. ................ 195/51

FOREIGN PATENTS
54,654 1967 Germany ..................... 195/51

Primary Examiner—Alvin E. Tanenholtz
Attorney—Michael S. Striker

ABSTRACT: A β-substituted propionic acid of the general formula

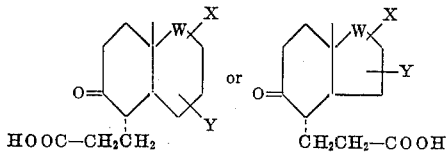

wherein W is $CH_2$, O or NH and wherein X and Y may be the same or different and are H, OH, =O, OAc, lower alkyl, hydroxy- or oxo- substituted lower alkyl, and wherein X and Y may be interconnected.

The acids are made by dissolving 3-keto-steroids in an organic water-soluble solvent and fermenting it with an aerobic culture of Nocardia SPEC and recovering the product from the fermentation medium.

β-SUBSTITUTED PROPIONIC ACIDS AND METHOD OF MAKING THE SAME

BACKGROUND OF THE INVENTION

The invention relates to β-substituted propionic acids wherein the substituent is a 3-keto- double ring of six members or of one six-member and one five-member ring fused together. Certain representatives of this class of compounds have previously been made. For instance, 7α-methyl-perhydroindandione-(1,5)-[β-propionic acid-(4)] was made both synthetically and by microbic degradation. Pat. No. 54,654 of the German Democratic Republic discloses 7α-methyl-1-acetyl-perhydroindanone-(5)-[β-propionic acid-(4)] made from $C_{21}$-steroids with cultures of the *Nocardia opaca* species or its enzymes. Similar compounds with an acid group in the 1-position have likewise been made by microbic methods. For instance, 7α-methyl-1-valerianic acid-perhydroindanone-(5)-[β-propionic acid-(4)] was made by cultivating Corynebacterium (Arthrobactor) simplex in a cholic acid-containing medium (British Pat. No. 1,078,166). Both of these processes suffer from the shortcoming that the reproducibility is poor. The stated yields frequently cannot be obtained and show strong deviations with minor changes in the growth conditions of the micro-organisms. The comparatively long fermentation times cause the formed compounds to be subject to partial further degradation and thus cause a further reduction of the yield. Besides, because of the long fermentation time, there is always an increased risk of contamination by external infection.

SUMMARY OF THE INVENTION

It is therefore one object of the invention to provide a method for making β-substituted propionic acids of the stated general type which can be generally employed and easily reproduced in a microbic way.

Another object is to provide such microbic ways of making the acids which can be carried out in a comparatively short fermentation time and without too much risk of infection of the fermentation medium.

These objects are met by compounds selected from the group consisting of

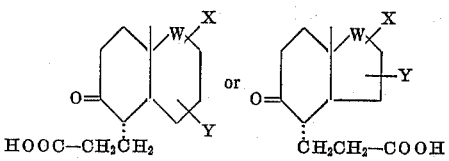

wherein W is $CH_2$, O or NH, X and Y may be the same or different and are H, OH, O, OAc, lower alkyl, or hydroxy- or oxo- substituted lower alkyl, and wherein X and Y may be interconnected to form a secondary ring.

These compounds are made by starting from the 3-keto-steroid of the general formula

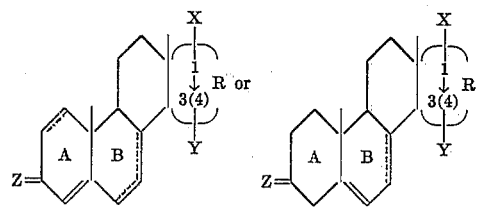

wherein X and Y have the meaning as above indicated and R is $(CH_2)_m$, $O(CH_2)_n$ or $NH(CH_2)_n$, and wherein m is 3 to 4 and n is 2 to 3 and R forms a fused ring with the adjoining carbon ring of the steroid, and Z is

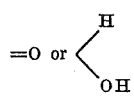

The 3-keto-steroids may have one or several unsaturated C—C bonds in Ring A or ring B or in both of these rings.

These starting products are dissolved in an organic water-soluble solvent and are then subjected to fermentation in an aerobic culture of *Nocardia SPEC* or one of its enzymes, followed by recovery of the propionic acid product.

DESCRIPTION OF THE PREFERRED EMBODIMENTS

In the above general formula, X and/or Y may, for instance, be methyl or ethyl, or they may be —$COCH_3$, —$CHOH$—$CH_3$, —$COCH_2OH$ or —$COCH_2OCOCH_3$.

Specific novel compounds illustrating the invention are, for instance:

1-methyl-cyclohexane-(1)-ol-(4)-one-2,3-dipropionic acid lactone:

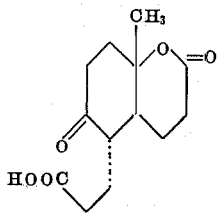

7a, 1α-dimethyl-perhydroindanol-(1)-one-(5)-[β-propionic acid-(4)]

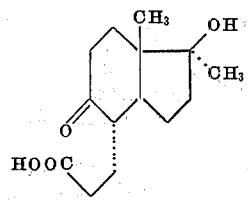

and 7a-methyl-1-acetyl-hexahydroindene-(1)-one-(5)-[β-propionic acid-(4)]:

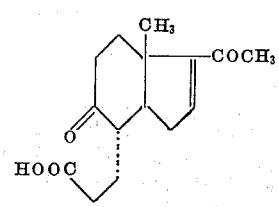

A preferred solvent for the 3-keto-steroid is dimethylformamide. A preferred species of the micro-organism *Nocardia SPEC* is *Nocardia opaca*. The fermentation is discontinued after 10 to 100 hours, preferably after 20 to 50 hours, whereupon the propionic acid product is isolated from the mass and recovered.

It is preferable to add to the fermentation solution a metal complex, particularly iron acetylacetonate. The micro-organism of the genus *Nocardia SPEC* is preferably cultivated in a specific manner. For instance, a micro-organism such as *Nocardia restrictus* or *Nocardia opaca* or an enzyme thereof, is cultivated in a culture medium containing nutritive agar of the following composition: dextrose 10.0 g., bact. peptone 10.0 g., casein hydrolysate 10.0 g., yeast extract 2.0 g., NaCl 6.0 g. per 1,000 cm.³ of tap water having a pH of about 7.0. This culture is further described in H. Prauser and W. Köhler, *Zeitschrift f. allgem. Mikrobiologie*, 5/4, 308 (1965). The micro-organism *Nocardia opaca* has been deposited in the Institute for Microbiology and Experimental Therapy of the German Academy of Science, at Beuthenberg-strasse 11, 69 Jena, German Democratic Republic.

The culture medium is then inoculated with Difco nutrient-broth and the steroid, for instance progesterone, dissolved in an organic solvent such as dimethylformamide, is added at the same time.

The fermentation is preferably carried out at an initial pH of 6.8. The pH will go down to about 5.3 during the fermentation. As indicated, it is preferable, furthermore, to add a metal complex, such as iron acetylacetonate, dissolved in an organic solvent, such as ethanol. After completion of the fermentation, the product is separated and isolated in conventional manner.

It is particularly preferable to add to the fermentation solution additionally an ion-exchange compound, preferably a basic ion-exchanger, such as Amberlite. The addition of the ion-exchanger in an amount corresponding to its capacity is effected at the time when the steroid is added to the inoculated culture medium. The compound obtained is thus immediately adsorbed by the ion-exchange compound and thus withdrawn from further degradation. The compound formed is then eluted with a solvent mixture, for instance a mixture of methanol and formic acid, and after concentration to dryness it is purified by dissolving it in sodium bicarbonate, acidifying it, and extracting it with an organic solvent such as chloroform or acetic ester. The ion-exchanger may subsequently be subjected to regeneration and reuse.

The process of the invention permits obtaining novel compounds. It is a one-stage rather simple process and has good and reproducible yields. A further advantage of the process of the invention is that high-steroid concentrations can be employed in the bacterial culture medium. The process also has the advantage that optically active compounds are formed. It is possible to shorten the fermentation time by adding metal complexes or ion-exchangers and to limit the further degradation of the formed compounds and the possible contamination by external infection.

The compounds of the invention are valuable as the metabolic products of anabolic, androgenic or progestationally active steroids. The metabolic products of these compounds exert a regulatory function in the human and animal organism and thus have substantial pharmacological importance.

They are also valuable for the synthesis of further biologically active compounds such as retrosteroids.

The following examples illustrate the invention:

EXAMPLE 1

1-methyl-cyclohexane-(1)-ol-(4)-one-2,3-dipropionic acid-lactone from testololactone:
100 round-bottomed flasks of 500-cc. capacity, each containing 100 cc. Difco-Nutrient broth, were set up for inoculation, each from a 3-day old slant tube of *Nocardia restrictus* which had been cultivated at 28° on 2 percent glycerin-agar. The further cultivation was effected at 25° C.
The cultivation was performed on a rotary table. 1 g. testololactone dissolved in 50 cc. dimethylformamide was evenly distributed in these 100 flasks after 24 hours and was further subjected to shaking for 42 hours at 25° C. The culture medium was then acidified for the further treatment with 5 N HCl to a pH of 3 and was extracted with chloroform. After distilling off the solvent, a brown oily residue was obtained which was twice subjected to chromatography on a silica gel column (15×250 mm.) 30 fractions each at 10 cm.$^3$ were then withdrawn as follows:

| Fractions | | |
|---|---|---|
| 1–5 | chloroform plus | 5% ethylacetate-formic acid mixture (100:25) |
| 6–10 | chloroform plus | 10% ethylacetate-formic acid mixture (100:25) |
| 11–15 | chloroform plus | 15% ethylacetate-formic acid mixture (100:25) |
| 16–20 | chloroform plus | 20% ethylacetate-formic acid mixture (100:25) |
| 21–25 | chloroform plus | 30% ethylacetate-formic acid mixture (100:25) |
| 26–30 | chloroform plus | 40% ethylacetate-formic acid mixture (100:25) |

Fractions 14–22 were dried and the crystalline residue (460 mg.=55% of the theoretical value) was recrystallized once each from chloroform and ethyl acetate. The compound had the following characteristics:
m.p.: 129–131°, $[\alpha]D22 -1.8°$ in acetone (c=1%).

EXAMPLE 2

7a, 1α-dimethyl-perhydroindanol-(1)-one-(5)-[β-propionic acid-(4)] from 17 α-methyltestosterone:
100 round-bottomed flasks of 500 capacity were each filled with 50 cc. Difco-Nutrient broth. They were then inoculated each day with a 4-day old slant tube of *Nocardia restrictus* which had been cultivated at 28° on a 2 percent glycerin-agar. The further cultivation was effected at 25° C. on a rotary table. After 24 hours, a total of 2.4 g. 17α-methyltestosterone (m.p. 163–168° C.) dissolved in 16 cc. dimethylformamide was added to this culture and the culture was subjected to shaking at 25° C. for a further 24 hours. For the further treatment, the culture medium was acidified with 5 N HCl to a pH of 3 and was subjected to three extractions with 500 cc. ethylacetate. The ethylacetate extractions were purified, concentrated to 100 cc. and three times shaken with saturated $NaHCO_3$ solution. The combined $NaHCO_3$ solutions were then acidified with 5 N HCl and subjected to three extractions with 50 cc. ethylacetate. After distilling off the solvent, a semicrystalline residue (1.49 g.) was obtained which was subjected to chromatography on a silica gel column (20×280mm.) for further purification.
20 fractions were then withdrawn, each amounting to 20 cc. The product was then eluted with a chloroform-ethylacetate-formic acid mixture (375:100:25). Fractions 9–15 yielded 1.0 g. of crystalline ketoacid after concentration, that is 49.5 percent of the theoretical yield. A recrystallization from ethylmethylketone and also from ethylacetate for each fraction yielded a total of 835 mg. 7a, 1α-dimethyl-perhydroindanol-(1)-one-(5)-[β-propionic acid-(4)]; m.p.: 162–166° C., $[\alpha]D^{20} - 34.9°$ in acetone (c=1%).

EXAMPLE 3

7a-methyl-1-acetyl-perhydroindanone-(5)-[β-propionic acid (4)] from progesterone:
50 cc. Difco-Nutrient broth were placed in a 500-cc. round-bottomed flask and were inoculated with the culture of a 5-day old slant tube of *Nocardia opaca*.
The latter had been cultivated at 28° C. on nutritive agar composed as follows:
10.0 g. dextrose
10.0 g. bact. peptone
10.0 cc. casein hydrolysate
2.0 g. yeast extract
6.0 g. NaCl
per 1,000 ml. tap water at about 7.0 pH. 150 mg. progesterone dissolved in 1 cc. dimethylformamide were at the same time added to the culture together with 5 mg. iron-acetylacetonate dissolved in 0.2 cc. alcohol. Further fermentation was carried out at 28° C. on a rotary table. The culture medium was acidified with 5 N HCl to a pH of 3 after about 48 hours and was subjected to three extraction steps with 50 cc. chloroform. The extracts were purified, dried over $Na_2SO_4$ and concentrated by evaporation. The residue was transferred in 20 cc. benzene/ether (in the proportion 1:1) to a shaking funnel and was shaken three times with 10 cc. of a 5% $NaHCO_3$ solution. The combined $NaHCO_3$ solutions were then acidified with 5 N HCl and subjected to three extraction steps with 20 cc. chloroform. The combined chloroform extracts after drying over $Na_2SO_4$ and distilling off the solvent furnished a crystalline residue. After solution in ether and treatment with a small amount of activated charcoal and concentration while being left to stand in the cold 7a-methyl-1-acetylperhydroindanone-(5)-[β-propionic acid-(4)] was obtained which had the following characteristics:
m.p.: 90–93° C. and $[\alpha]D^{23}+79°$ (chloroform).
yield: 77 percent of the theoretical.

EXAMPLE 4

7a-methyl-1-acetyl-perhydroindanone-(5)-[β-propionic acid-(4)]from progesterone:

50 cc. Difco-Nutrient broth were inoculated in a round-bottomed flask of 500 cc. capacity with the culture of a 5–6-day old slant tube of Nocardia opaca. The latter had been cultivated at 28° C. on nutritive agar of the following composition:

- 10.0 g. dextrose
- 10.0 g. bact. peptone
- 10.0 g. casein hydrolysate
- 2.0 g. yeast extract
- 6.0 g. NaCl per 1,000 ml. of tap water at a pH of 7.0. 150 mg. progesterone dissolved in 1 cc. dimethylformamide were then added together with 10 cc. Amberlite IRA 410 which had previously been converted to the carbonate form with 1N $Na_2CO_3$ solution. The subsequent fermentation was carried out at 28° C. on a rotary table. The product was filtered off from the exchange compound after 48 hours and successively washed with water and methanol. After transferring it to a column (15×100 mm.) the solution was eluted with 200 cc. methanol-formic acid mixture (95:5). The eluate was brought to dryness at about 40° C., was dissolved in a little 5 percent $NaHCO_3$ solution, acidified with 5 N HCl and extracted with chloroform. After distilling off the solvent, there was obtained 7a-methyl-1-acetyl-perhydroindanone-(5)-[β-propionic acid-(4)]in crystalline form. The yield amounted to 80 percent of the theoretical yield.

EXAMPLE 5

7a-methyl-1-acetyl-hexahydroindene-(1)-one-(5)-[β-propionic acid-(4)]from 16-dehydro-pregnanolone-acetate:

50 cc. Difco-Nutrient broth were filled into each of 60 500-cc. round-bottomed flasks and were inoculated with a 5-day old slant tube Nocardia opaca which had been cultivated at 28° C. on a nutritive agar made in the same manner as in Examples 3 and 4. A solution of 6 g. pregnenolone-acetate in 60 cc. dimethylformamide was simultaneously added to the broth together with 300 cc. Amberlite IRA 410 which previously had been converted to the carbonate form with 1N $Na_2CO_3$ solution. The pregnenolene-acetate and the ion-exchange compound were evenly distributed in the 60 flasks. The subsequent fermentation was carried out at 28° C. on a rotary table. After standing for 48 hours, the product was filtered off the ion-exchange compound and washed successively with water and methanol and was then shaken in 1 l. of a methanol-formic acid mixture (in the proportion of 95:5.) After completion of the $CO_2$ evolution, the exchanger was placed in a column (40×300 mm.) and eluted with a further 2 l. of the methanol-formic acid mixture. The eluate was then dried in a water jet vacuum pump at about 40° C. and the residue was dissolved in 300 cc. of 5 percent $NaHCO_3$ solution and thereafter acidified with 50 cc. 5 N HCl and subjected to three extraction steps with 250 cc. chloroform. The extracts were combined and dried over $Na_2SO_4$. After distilling off the solvent, a crystalline residue was obtained which was dissolved in 200 cc. ether and then treated with a small amount of activated charcoal. After concentration by standing in the cold, the 7a-methyl-1-acetyl-hexahydroindene-(1)-one-(5)-[β-propionic acid-(4]crystallized out. The product had a melting point between 138° and 140° C.

What is claimed as new and desired to be protected by Letters Patent is set forth in the appended:

1. The process of making a β-substituted propionic acid selected from the group consisting

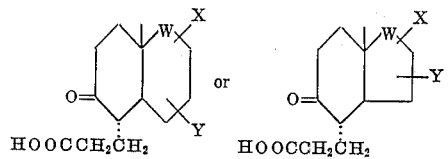

wherein W is $CH_2$ or O, X and Y may be the same or different and are H, OH, O, OAc, lower alkyl, or hydroxy- or oxo-substituted lower alkyl, the said process comprising subjecting a solution, in an organic water-soluble solvent, of a 3-keto-steroid of the general formula:

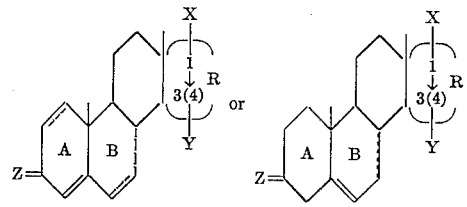

wherein X and Y have the meaning as above indicated and R is $(CH_2)_m$ or $O(CH_2)_n$, and wherein M is 3 to 4 and n is 2 to 3 and R forms a fused ring with the adjoining carbon ring of the steroid and Z is =O or

to fermentation in an aerobic culture of the species Nocardia opaca or Nocardia restrictus or of a steroid degrading enzyme thereof, adding a basic ion-exchange compound to the culture medium substantially simultaneously with the steroid, separating the ion-exchange compound after discontinuing the fermentation, and finally recovering the propionic acid product.

2. The process of claim 1 wherein the fermentation is discontinued after a period of 10 to 100 hours, whereupon the final product is isolated from the mass and recovered.

3. The process of claim 1 wherein the fermentation is discontinued after a period of 20 to 50 hours, whereupon the final product is isolated from the mass and recovered.

4. The process of claim 1 wherein iron acetylacetonate dissolved in ethanol is added to the culture medium.

5. The process of claim 1 wherein the steroid used as starting product is progesterone, testololactone, methyl testosterone or pregnenolene-acetate.

6. The process of claim 1 wherein the solvent for the steroid is dimethylformamide.

7. The process of claim 1 wherein the micro-organism is cultivated in a culture medium of the following composition: dextrose 10.0 g., bact. peptone 10.0 g., casein hydrolysate 10.0 g., yeast extract 2.0 g., NaCl 6.0 g. per 1,000 cm.³ of tap water having a pH of about 7.0.

8. The process of claim 7 wherein the culture medium is inoculated with Difco-nutrient broth and wherein the steroid is simultaneously added to the culture medium.

* * * * *